US012754934B2

(12) United States Patent
Gill et al.

(10) Patent No.: US 12,754,934 B2
(45) **Date of Patent: *Oct. 6, 2026**

(54) UNSUPERVISED SEGMENTATION OF A UNIVARIATE TIME SERIES DATASET USING MOTIFS AND SHAPELETS

(71) Applicant: HEWLETT PACKARD ENTERPRISE DEVELOPMENT LP, Spring, TX (US)

(72) Inventors: Mantej Singh Gill, Bangalore (IN); Madhusoodhana Chari Sesha, Bangalore (IN); Dhamodhran Sathyanarayanamurthy, Bangalore (IN); Anil Babulal, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/785,506

(22) Filed: Jul. 26, 2024

(65) Prior Publication Data

US 2024/0386035 A1 Nov. 21, 2024

Related U.S. Application Data

(63) Continuation of application No. 17/991,500, filed on Nov. 21, 2022, now Pat. No. 12,050,626.

(51) Int. Cl.
*G06F 16/28* (2019.01)
*G06N 20/00* (2019.01)

(52) U.S. Cl.
CPC ........... *G06F 16/285* (2019.01); *G06N 20/00* (2019.01)

(58) Field of Classification Search
CPC ........... G06F 16/2477; G06F 16/24568; G06F 16/285; G05N 20/00

(Continued)

(56) References Cited

U.S. PATENT DOCUMENTS

| | | | | |
|---|---|---|---|---|
| 10,789,495 B2 * | 9/2020 | Zink | ...................... | G06V 20/56 |
| 2015/0269050 A1 | 9/2015 | Filimonov et al. | | |

(Continued)

FOREIGN PATENT DOCUMENTS

| | | |
|---|---|---|
| CN | 106104496 A | 11/2016 |
| CN | 113632112 A | 11/2021 |
| CN | 114365091 A | 4/2022 |

OTHER PUBLICATIONS

Aghbari et al., "Finding K Most Significant Motifs in Big Time Series Data", The 3rd International Conference on Emerging Data and Industry 4.0 (EDI40), Apr. 6-9, 2020, 7 pages.

(Continued)

*Primary Examiner* — Hung T Vy
(74) *Attorney, Agent, or Firm* — Hewlett Packard Enterprise Patent Department

(57) ABSTRACT

Systems and methods are provided for receiving a time series dataset from a monitored processor and group the dataset into a plurality of clusters. Using an unsupervised machine learning model, the system may combine a subset of the plurality of clusters by data signature similarities to form a plurality of motifs and combine the plurality of motifs into one or more shapelets. In some examples, the system may train a supervised machine learning model using the plurality of motifs and the one or more shapelets as input to the supervised machine learning model. The system can perform various actions in response to labelling the time series dataset, including predicting a second time series dataset, determining that a monitored processor corresponds with an overutilization at a particular time, or suggesting a reduction of additional utilization of the monitored processor.

20 Claims, 8 Drawing Sheets

(58) Field of Classification Search
USPC .......................................................... 707/737
See application file for complete search history.

(56) References Cited

U.S. PATENT DOCUMENTS

| | | | | |
|---|---|---|---|---|
| 2019/0320329 | A1 | 10/2019 | Gódor et al. | |
| 2020/0258157 | A1* | 8/2020 | Law | G06Q 40/04 |
| 2020/0327456 | A1 | 10/2020 | Sathe et al. | |
| 2021/0082292 | A1 | 3/2021 | Sindhwani et al. | |
| 2021/0342642 | A1 | 11/2021 | Shabtay et al. | |
| 2023/0076947 | A1* | 3/2023 | Rasmus-Vorrath | G01J 1/4228 |

OTHER PUBLICATIONS

Hewlett Packard Enterprise, "HPE InfoSight," retrieved online Jan. 10; 2024, https:/iwvvvv.hpe.com/in/en/solutions/infosight.html.

Keogh, E. et al., "Clustering of Time-series Subsequences is Meaningless: Implications for Previous and Future Research," Aug. 31, 2004, Springer-Verlag Knowledge and Information Systems 8: 154-177.

Law, S. M., "STUMPY: A Powerful and Scalable Python Library for Time Series Data Mining," 2019, .Journal of Open Source Software, 4(39), 1504, https:/idoi.org/10.21105/joss.01504.

Lexiang Ye, "Time series Shapelets: a New primitive for data Mining", KDD'09, Jun. 29-Jul. 1, 2009, Paris, France.

Phu et al., "Motif-Based Method for Initialization the K-Means Clustering for Time Series Data", Springer, Dec. 2011, 11 pages.

Stack Overflow, "How to find the last local maximum of a pandas time series?", available online at <https://stackoverflow.com/questions/52537299/how-to-find-the-last-local-maximum-of-a-pandas-time-series>, Sep. 27, 2018, 3 pages.

Wang et al., "Improving fuzzy c-means clustering based on feature-weight learning", Pattern Recognition Letters, vol. 25, Issue 10, Jul. 16, 2004, pp. 1123-1132.

* cited by examiner

UNSUPERVISED SEGMENTATION OF A UNIVARIATE TIME SERIES DATASET USING MOTIFS AND SHAPELETS

CROSS REFERENCE TO RELATED APPLICATIONS

This application is a continuation of, and claims the priority benefit of U.S. patent application Ser. No. 17/991,500, filed on Nov. 21, 2022, issued as U.S. Pat. No. 12,050,626, the contents of which are incorporated herein by reference in their entirety.

BACKGROUND

As the complexity, size, and processing capacity of computer systems increase, processes performed by these computer systems continue to grow as well. Monitoring systems have grown in popularity to try to manage the applications executed by the computer systems and increase the overall efficiency of the computer systems. However, this is a difficult task. Data is created at ever increasing rates that make it difficult to review. When the review of the data is passed to a third party, the data received by the third part may not have access to all of the environmental data at the computer system.

BRIEF DESCRIPTION OF THE DRAWINGS

The present disclosure, in accordance with one or more various embodiments, is described in detail with reference to the following FIGURES. The FIGURES are provided for purposes of illustration only and merely depict typical or example embodiments.

Figure 1:
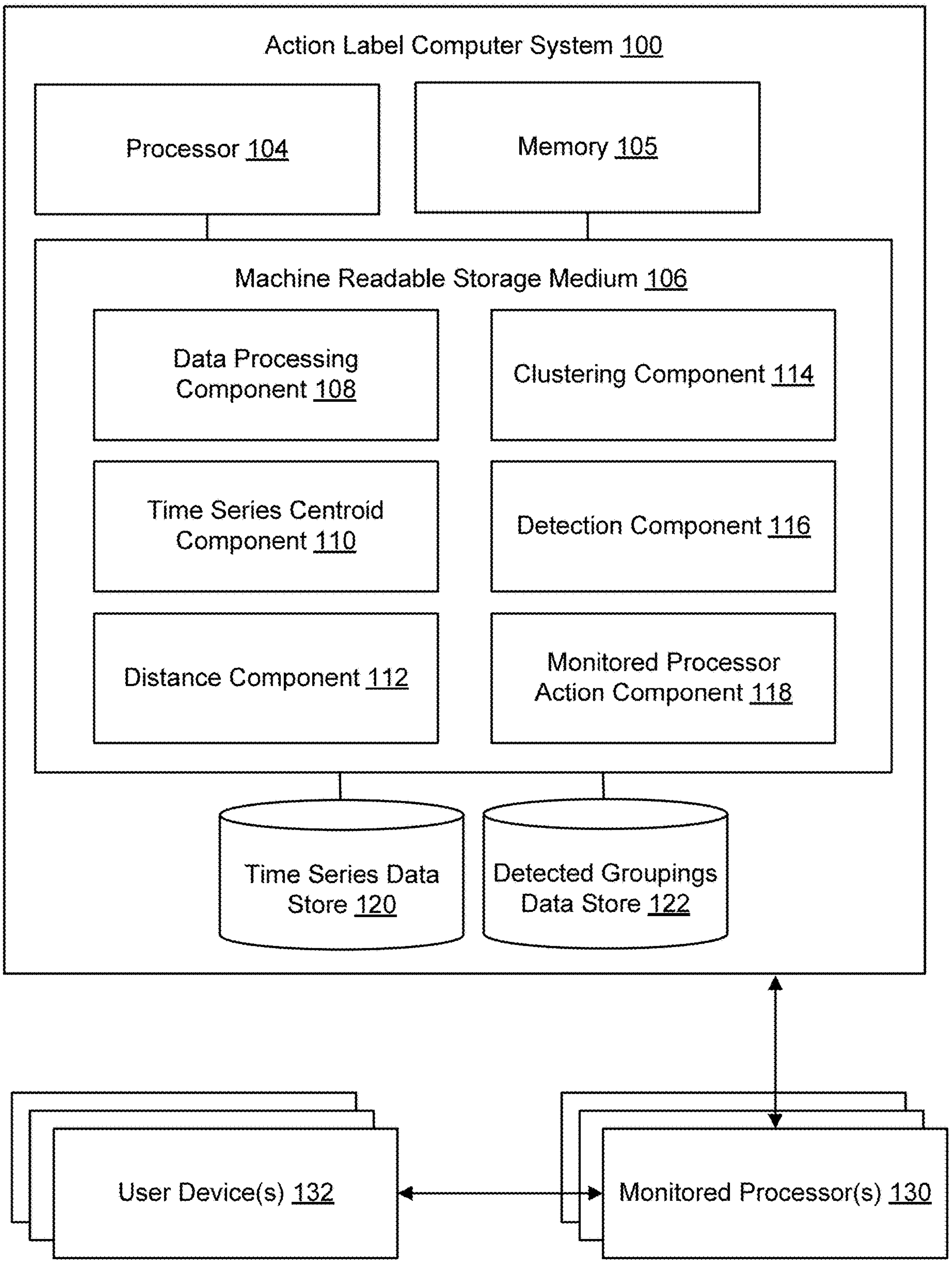
FIG. 1 illustrates an action label computer system, monitored processor, and user devices, in accordance with some examples of the disclosure.

The FIGURES are not exhaustive and do not limit the present disclosure to the precise form disclosed.

DETAILED DESCRIPTION

Sensor data, unlike other structured data of a server, is time-series in nature and poses the challenge of comprising a large amount of data with little ability for a human to understand it. As a result, data center administrators are unable to read and understand the data. Analytics teams, in addition to data center administrators, can face the same challenge while trying to apply analytics to unprocessed time series. Hence, there is a need to find solutions that can help identify the regions of interest, repeating patterns, anomalies, and trends in time-series datasets.

For example, a simple time series dataset may include data points corresponding with a central processing unit (CPU) utilization (e.g., in GHz) for a personal computer, where the utilization of the CPU is recorded every second of every day. When the time-series dataset is plotted on a graph that maps time (x-axis) versus utilization (y-axis), the graph may illustrate spikes or dips in the CPU utilization over time. In other words, applications may be executed (e.g., a spike in CPU utilization) or the CPU may remain idle (e.g., a dip in CPU utilization) without consideration for the current CPU utilization value. When new applications are executed, the CPU of the personal computer may respond by running the new applications slower, causing general inefficiencies in the use of the personal computer. In this example, the time series dataset may be analyzed to provide a general understanding of how the CPU is utilized over time (e.g., throughout the day or month).

Continuing with this simplified example, the time series dataset may be provided to a second computer. The second computer may analyze the time series dataset to determine patterns of CPU utilization over time in the time series dataset. The second computer can then associate the patterns with data signatures of applications executed by the CPU. In this sense, the second computer can determine the timing and repetition of when particular applications are executed by the CPU without having access to an application list, timing of when particular applications are executed, or even the particular components of the computer system associated with the CPU.

Expanding on this simplified example, the CPU may be part of a monitored distributed system with several monitored processors and the second computer may be a system for optimizing operation of the monitored processor. The time series dataset can comprise information from the monitored processor that is in addition to (or other than) CPU utilization, including any time series dataset that corresponds with a use of a sensor incorporated with the monitored processor. The system may receive the time series dataset from a sensor of a monitored processor (e.g., the sensor, group of sensors, monitored computer, etc.). The data may comprise an univariate time series dataset.

To facilitate analysis of the time series dataset of the monitored processor and optimize the use of the use of the monitored system, the system may group the time series dataset into a plurality of clusters. For example, a set of five time series data entries may correspond with the execution of a single application at the beginning of each hour throughout the day (e.g., corresponding with an automated system check process). Each of these activations may cause a spike in the CPU utilization of the monitored processor. The system can identify a pattern of spikes in the time series dataset and group each spike in the dataset as a cluster that corresponds with the same activity at the monitored processor. The time series dataset may correspond with a plurality of these clusters across several time intervals.

The system may further identify similarities across the plurality of clusters and combine a subset of the plurality of clusters by data signature similarities to form a plurality of motifs. The identified similarities across multiple clusters may be determined using various methods. For example, the system may implement an unsupervised machine learning model that is trained to identify similar data signatures in each cluster and match the data signatures between clusters in order to form the plurality of motifs. In this sense, the system may extract the motifs from the univariate time series dataset (e.g. using a customized K-Means algorithm or other clustering algorithm for extracting). The extraction may identify and cluster similar data patterns in the univariate time series dataset, and output the motifs (e.g., representative of repeated patterns and subsequences).

Next, the process may group the motifs as shapelets (e.g., a combination of motifs). That is, the motifs can be compared to other motifs using a dynamic time warping algorithm to find nearest matches which comprise the aforementioned motifs. The motifs may be combined to form the shapelets. Any anomalies in the processed dataset relative to the motifs or shapelets can be identified as anomalies in the data overall.

Using the multiple levels of grouped data, the system may predict a second time series dataset using the plurality of motifs or shapelets. The motifs or shapelets may both be used as labels, in a sense, to help characterize related data that can be applied in an automated and unsupervised manner, without a need for manual annotation.

In some examples, the system may initiate an action based on the prediction of the second time series dataset. For example, the action may comprise determining that the monitored processor corresponds with an overutilization at a particular time and transmitting an electronic communication to an account associated with the monitored processor. The electronic communication can suggest reducing additional utilization of the monitored processor after the particular time. In another example, the action may comprise determining that the monitored processor corresponds with an overutilization at a particular time and transmitting an electronic communication to an account associated with a different monitored processor than the monitored processor. The electronic communication can include a prediction of overutilization of a different monitored processor. In another example, the action may comprise a prediction of the next plurality of motifs (e.g., using the trained machine learning model).

Technical improvements are realized throughout the disclosure. For example, the disclosed technology can utilize underused processor data for a monitored processor in order to initiate an action on the monitored processor, including reducing additional utilization, predicting that overutilization may occur in the future, or other actions discussed herein. By predicting these future outcomes, the system may adjust operation to prevent predicted inefficiencies in the future.

FIG. 1 illustrates a computer system, monitored processor, and user devices, in accordance with some examples of the disclosure. In this example, the computer system, illustrated as a special purpose computer system, is labeled as action label computer system 100. Action label computer system 100 is configured to interact with monitored processor(s) 130 using processor 104, memory 105, and machine readable storage medium 106. Monitored processor(s) 130 may interact with one or more user device(s) 132. Action label computer system 100 may be implemented as a cloud system, data center computer server, as a service, or the like, although such limitations are not required with each embodiment of the disclosure.

Processor 104 may comprise a general-purpose or special-purpose processing engine such as, for example, a microprocessor, controller, or other control logic. Processor 104 may be connected to a bus, although any communication medium can be used to facilitate interaction with other components of scanning and 3D model generation user device 102 or to communicate externally.

Memory 105 may comprise random-access memory (RAM) or other dynamic memory for storing information and instructions to be executed by processor 104. Memory 105 might also be used for storing temporary variables or other intermediate information during execution of instructions to be executed by processor 104. Memory 105 may also comprise a read only memory ("ROM") or other static storage device coupled to a bus for storing static information and instructions for processor 104.

Machine readable storage medium 106 is configured as a storage device that may comprise one or more interfaces, circuits, and modules for implementing the functionality discussed herein. Machine readable storage medium 106 may carry one or more sequences of one or more instructions processor 104 for execution. Such instructions embodied on machine readable storage medium 106 may enable interaction with monitored processor(s) 130 to perform features or functions of the disclosed technology as discussed herein. For example, the interfaces, circuits, and modules of machine readable storage medium 106 may comprise, for example, data processing component 108, time series centroid component 110, distance component 112, clustering component 114, detection component 116, and monitored processor action component 118.

Data processing component 108 is configured to receive a time series dataset and store the data in time series data store 120. The time series dataset may be received from a sensor of monitored processor 130 and comprise various data signatures at different times. In some examples, the data received from monitored processor 130 is limited to what a third party responsible for monitored processor 130 is willing to provide. As such, a complete data history or components of the data may not be available when the time series dataset is received.

Illustrative examples of time series datasets are provided. For example, the time series dataset may correspond with monitored processor 130 of a server's input power supply, where input power is provided to the server and sampled at an hourly basis. Another example of a time series dataset corresponds with processor utilization as the processor is executing instructions for a plurality of software applications, as illustrated with FIG. 2.

Time series centroid component 110 is configured to determine each centroid of the dataset in anticipation for grouping the data as a plurality of clusters. The centroids can be initialized using various methods, including a random selection (e.g., a random selection of data points in the received dataset), a K-Means cluster algorithm or K-Means++ (e.g., by assigning each data point to the cluster with the nearest mean, not minimum/maximum), or by initializing the centroids with outlier points in a customized K-Means cluster algorithm.

In some examples, the clustering algorithm (e.g., a custom K-means algorithm) can be configured to analyze a small subset of the univariate time series dataset to find local minima and maxima of subsets of the time series dataset, which can then be associated with a nearest centroid using a skewed Euclidean distance function. This creates some number of clusters, after which, the position of those nearest centroids are calculated again until the data associated with a centroid no longer changes, but rather remains consistent. These become the clusters that are analyzed to identify the aforementioned motifs, shapelets, and ultimately, anomalies.

The customized K-Means cluster algorithm may consider the linear fashion that the time series dataset was recorded in determining each cluster centroid. In this sense, time series centroid engine 110 can group data points that are near in time to each other so they are more likely to be grouped with other readings from the same application, which are stored in detected groupings data store 122. The clusters may comprise centroids, outlier points, and local maxima and local minima. The local maxima and local minima may be determined to segregate the cluster into smaller clusters, where each smaller cluster can include one significant minima or maxima point.

To find the local minima and maxima on a very small subset of time series data, time series centroid engine 110 may use an outlier centroid initialization method. For example, first, time series centroid engine 110 may assume the recently found centroids are k in number. Next, each data point may be associated with the nearest centroid (e.g., using the skewed Euclidean distance function). This will divide the data points into k clusters. With the clusters, then, time series centroid engine 110 may re-calculate the position of centroids using the skewed Euclidean distance function. Any of these steps may be repeated until there are no more changes in the membership of the data points, including dividing the data points into k clusters and calculating the position of centroids using the skewed Euclidean distance function, until there are no more changes. Time series centroid engine 110 may provide or output the data points with cluster memberships.

In some examples, contrary to the standard K-Means random centroid initialization method, time series centroid engine 110 may determine the number of clusters in an automated and dynamic process. The clusters may not be defined manually. In other words, the number of clusters may be based on the number of maxima and minima points in the time-series data. Illustrative examples of minima and maxima are provided in FIG. 3.

In some examples, the minima and maxima determined by time series centroid engine 110 may correspond with actual values from the time series dataset. The centroid of the cluster may not be chosen from a value that is not included with the data set (e.g., a mean or average value). Rather, the minima and maxima may correspond with actual data points received from monitored processor 130.

Distance component 112 is configured to determine a distance between each of the data points and centroids in the clusters, with respect to the time series constraint (e.g., along a linear time series). This may improve standard distance functions that may wrongly cluster data points without respect to the linear inherency of time series data.

The distance formula may determine an amount of change in the time axis (e.g., x-axis) as weighed less compared to the same amount of change on the performance metric axis (e.g., y-axis) so that data points can be clustered following the time axis. One example of a genre of distance formula that can be used is:

$$d = \sqrt{(x_2 - x_1)^2 + (y_2 - y_1)^4}$$

Where "4" may be replaced with an "n" value that is even and greater than or equal to 4. The value may be configurable and customized by a user operating user device 132. This value may be an exponential multiplier of the "y" portion of the formula, which is usually set to a fraction value. When the fraction value is raised to a higher power "n," the "y" portion of the formula may become smaller. More weight may correspond with the x-axis, which corresponds with the time values and can group the time series data along the linear path.

Clustering engine 114 is configured to determine one or more clusters. For example, clustering engine 114 may receive the local minima and maxima of subsets of the time series dataset and the nearest centroid (determined from time series centroid engine 110). The two datasets may be correlated to form a plurality of clusters, then the position of the nearest centroids may be calculated again until the calculated centroid no longer changes, but rather remains consistent. These become the clusters that are analyzed to identify the motifs, shapelets, and ultimately, anomalies.

Detection engine 116 is configured to implement dynamic time warping (DTW) process on the defined clusters to detect similarities between the clusters (e.g., in terms of the data points forming a shape within each cluster) and generate one or more motifs. The DTW process can calculate an optimal match between two time series datasets by measuring the similarity between the two datasets along the linear time sequence. The optimal match may satisfy various restrictions including, for example, every index from the first sequence must be matched with one or more indices from the other sequence, and vice versa, the first index from the first sequence must be matched with the first index from the other sequence (but it does not have to be its only match), the last index from the first sequence must be matched with the last index from the other sequence (but it does not have to be its only match), or the mapping of the indices from the first sequence to indices from the other sequence must be monotonically increasing, and vice versa. The optimal match may also satisfy a minimal cost, where the cost is computed as the sum of absolute differences, for each matched pair of indices, between their values.

Figure 4:
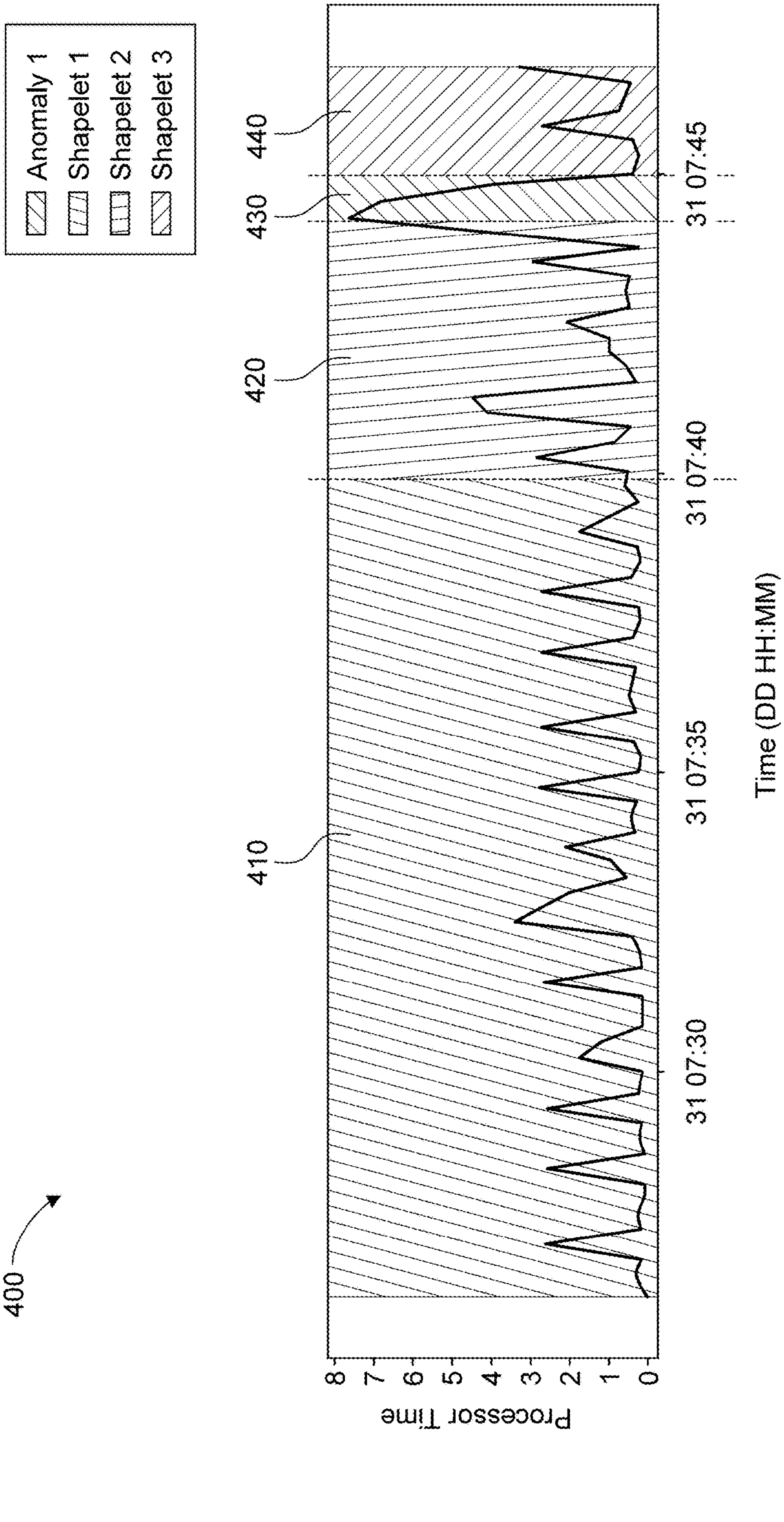
FIG. 4 provides an example of time series data with the outlier identified, in accordance with some examples of the disclosure.

Detection engine 116 is configured to determine outliers as well. An example of the motif determination process, shapelet determination process, and outlier determination process is illustrated in FIG. 4.

Monitored processor action engine 118 is configured to initiate an action based on the prediction of the second time series dataset. For example, the action may comprise determining that monitored processor 130 corresponds with an overutilization at a particular time and transmitting an electronic communication to an account associated with the monitored processor. The electronic communication can suggest reducing additional utilization of the monitored processor after the particular time.

In another example, the action may comprise determining that the monitored processor corresponds with an overutilization at a particular time and transmitting an electronic communication to an account associated with a different monitored processor than the monitored processor. The electronic communication can include a prediction of overutilization of a different monitored processor.

In another example, the action may comprise a prediction of the next plurality of motifs (e.g., using the trained machine learning model).

Figure 2:
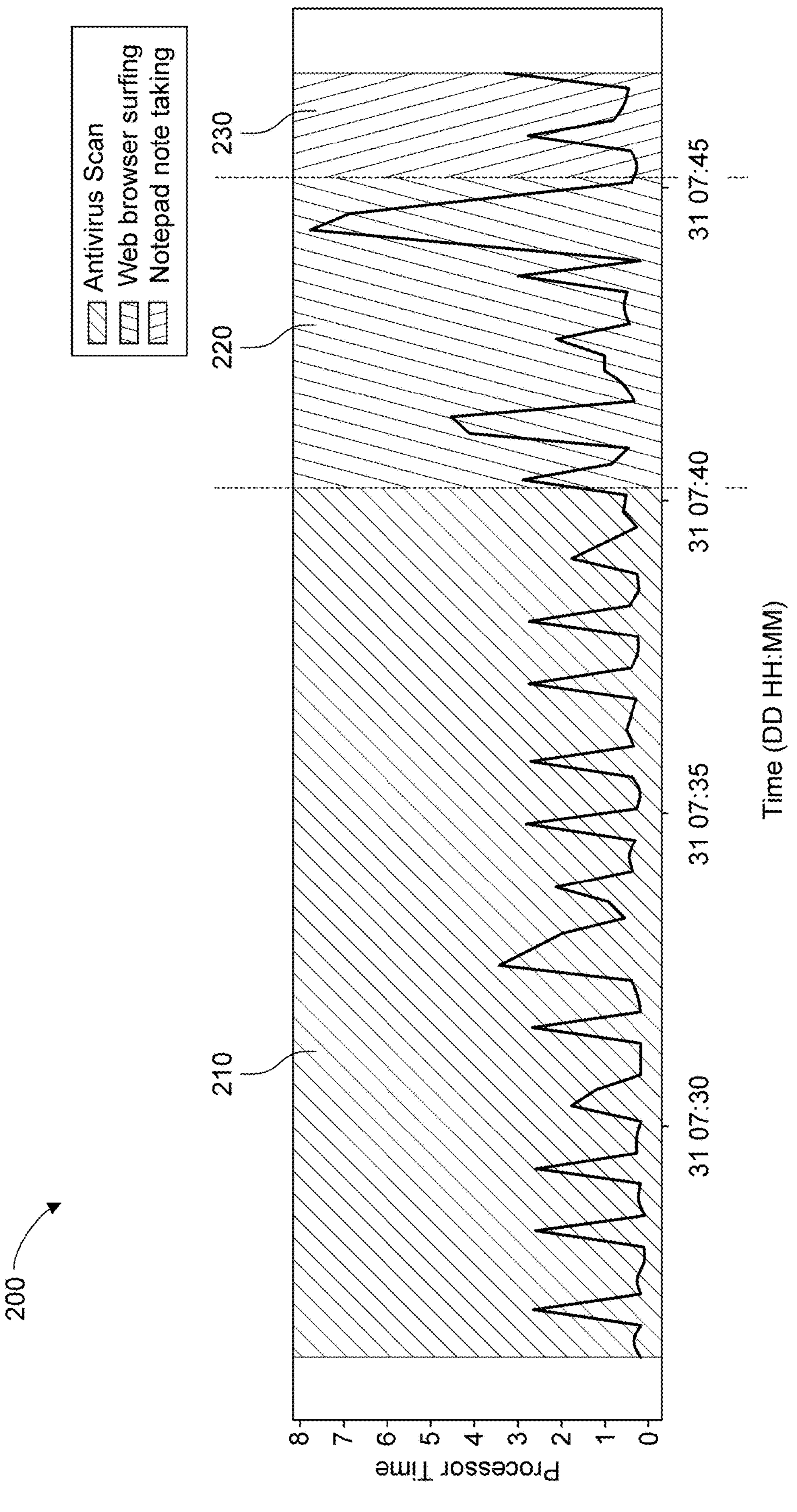
FIG. 2 provides an example of time series data, in accordance with some examples of the disclosure.

FIG. 2 provides an example of time series data, in accordance with some examples of the disclosure. In example 200, the processor time is identified for a monitored processor that runs three different applications during 15 seconds, illustrated as first application 210 (e.g., an antivirus scan), second application 220 (e.g., a web browser video), and third application 230 (e.g., a notepad application). Each of the applications run without overlapping processor time to illustrate the distinctions between the signatures. In this example, the applications 210, 220, and 230 were run independently, exclusively, and consecutively to observe the difference in the time series signature of each application.

Figure 3:
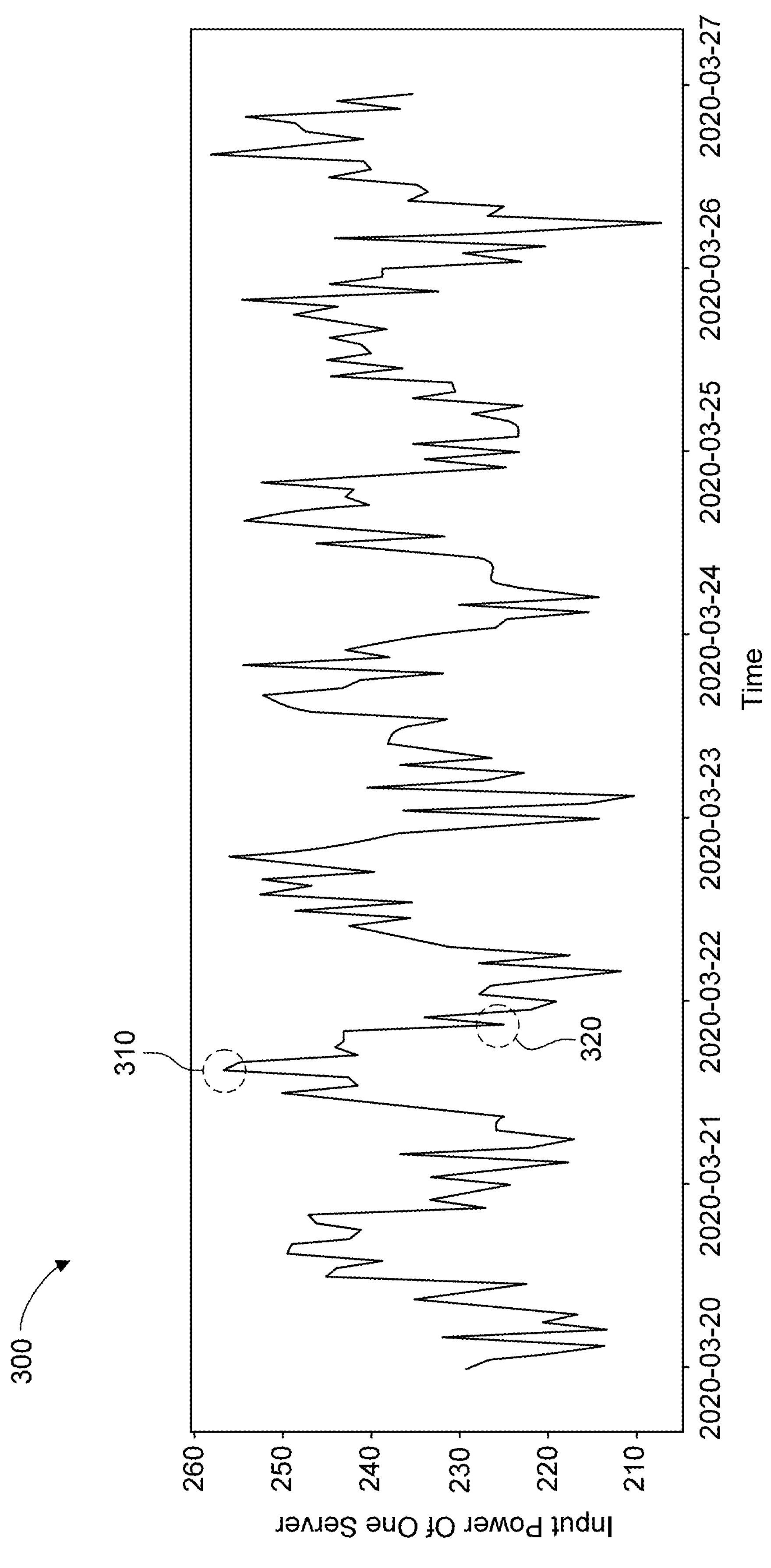
FIG. 3 provides an example of minima and maxima of the time series data, in accordance with some examples of the disclosure.

FIG. 3 provides an example of minima and maxima of the time series data, in accordance with some examples of the disclosure. In example 300, an illustrative time series dataset is provided with an illustrative maxima data point 310 and an illustrative minima data point 320. For example, each instance where the points in the dataset, along a linear progression of the time series, changes direction (e.g., progresses from increasing to decreasing, or from decreasing to increasing, etc.), a minima point or a maxima point may be identified. In some examples, time series centroid engine 110 is configured to store the minima or maxima in time series data store 120.

FIG. 4 provides an example of time series data with the outlier identified, in accordance with some examples of the disclosure. In example 400, the time series data is repeated from example 200 of FIG. 2, where the processor time is identified for a monitored processor that runs three different applications during 15 seconds, including first application 410 (e.g., an antivirus scan), second application 420 (e.g., a web browser video), and third application 440 (e.g., a notepad application). Additionally, an outlier is identified between the second application and third application, illustrated as outlier 430.

Figure 5:
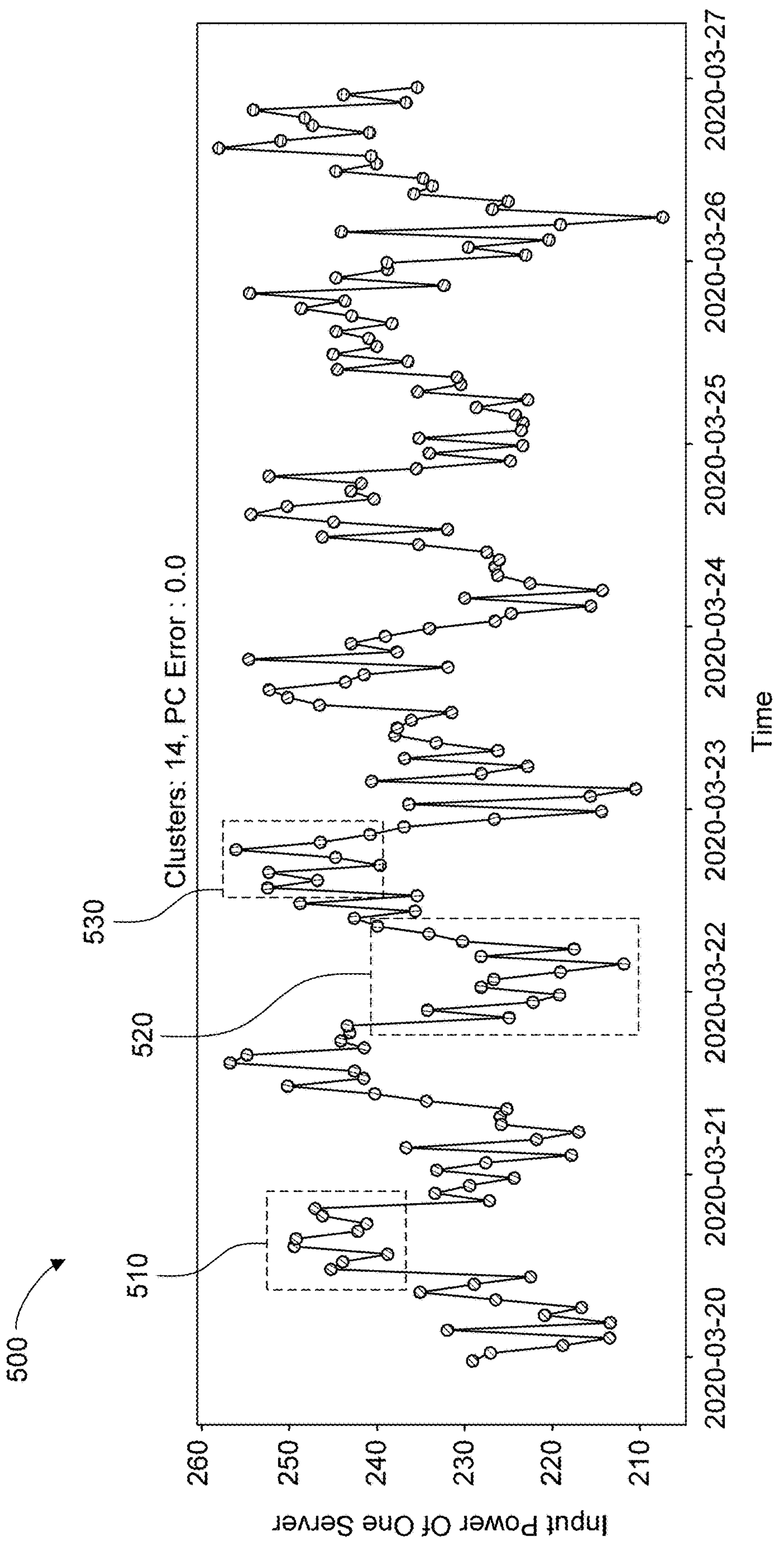
FIG. 5 provides an example of time series data with clusters identified, in accordance with some examples of the disclosure.

FIG. 5 provides an example of time series data with clusters identified, in accordance with some examples of the disclosure. In example 500, the time series data is analyzed and grouped as a plurality of clusters, where the data signature similarities are used to form a plurality of motifs using an unsupervised machine learning model. Illustrative clusters are provided, shown as first cluster 510 and second cluster 520. These clusters may help create labeled time series data, where each cluster corresponds with a different label (e.g., different application or data signature, etc.). A similar cluster to first cluster 510 is identified as a third cluster 530, which have a similar data signature determined using the unsupervised machine learning model. The model may be trained to identify similar data signatures in each cluster and match the data signatures.

In this context, each group of similar curves can generate a motif. As discussed herein, each motif may represent a repeated pattern and subsequence of data points that are grouped into each cluster. As illustrated in FIG. 4, multiple similar shapes of data points in first application 410 (e.g., an antivirus scan) are each motifs of the dataset. Multiple motifs may be combined to form a shapelet, which may correspond with the entire dataset corresponding with first application 410.

Figure 6:
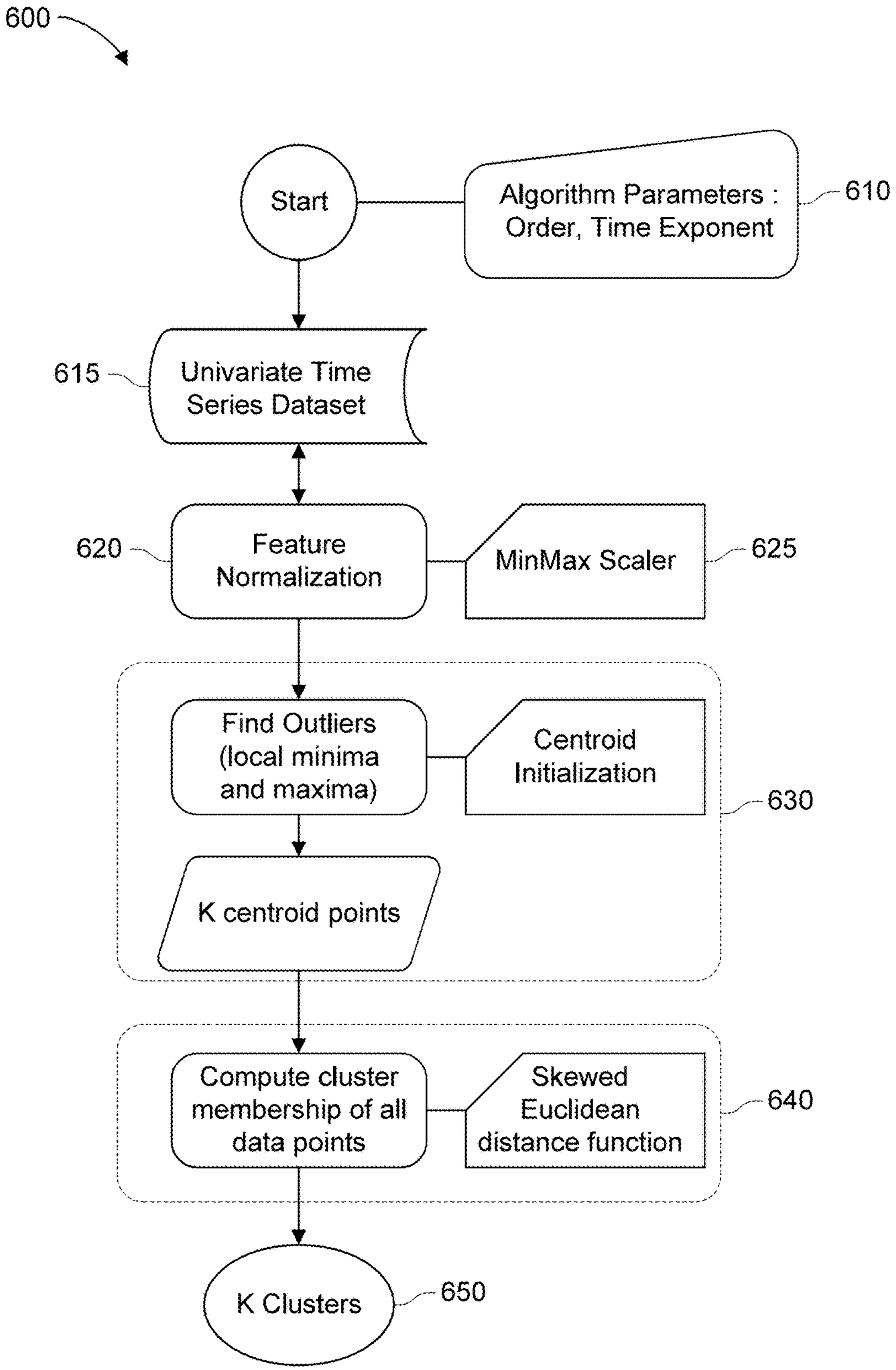
FIG. 6 illustrates a process for generating one or more clusters data, in accordance with some examples of the disclosure.

The clusters may be formed using various processes, including the process illustrated in FIG. 6 to implement a custom K-Means clustering algorithm with outlier centroid initialization and a skewed Euclidean distance function. In illustrative example 600, clustering engine 114 may perform one or more steps to determine the plurality of clusters.

At block 610, the input may include algorithm parameters, some of which may be altered by a user operating user device 132 of FIG. 1. The input may include, for example, input data points D, an order parameter θ, and a time component N in order to generate data points with cluster memberships.

At block 615, the time series dataset may be received (e.g., by data processing component 108). The time series dataset may be received from a sensor of monitored processor 130 and comprise various data signatures at different times.

At block 620, the data may be processed, including implementing a feature normalization on the time series dataset. For example, feature normalization may scale the individual samples of data from the time series dataset to have common and consistent unit measurements.

At block 625, the data may be further processed, including implementing a scaler process on the time series dataset. The scaler process can help improve wide variations in the data to create small standard deviations of features and preserve zero entries in sparse data.

At block 630, clustering component 114 may receive the local minima and maxima using the outlier centroid initialization method to obtain centroids c1, c2, . . . ck. As discussed with the process performed by distance component 112 of FIG. 1, the order parameter may be adjusted to determine various centroids.

At block 640, for each data point xi, find the nearest centroid (c1, c2, . . . ck) using the Skewed Euclidean distance function and assign the point to that cluster. The Skewed Euclidean distance function may comprise the distance formula as discussed with distance component 112 of FIG. 1.

At block 650, repeat block 630 and block 640 with different values of the Order parameter θ and Time exponent N. These groups of values become the clusters that are analyzed to identify the motifs, shapelets, and ultimately, anomalies, then stored in detected groupings data store 122 of FIG. 1.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, making or achieving performance better than that which can be achieved with other settings or parameters, or making or achieving performance better than a pre-defined threshold.

Figure 7:
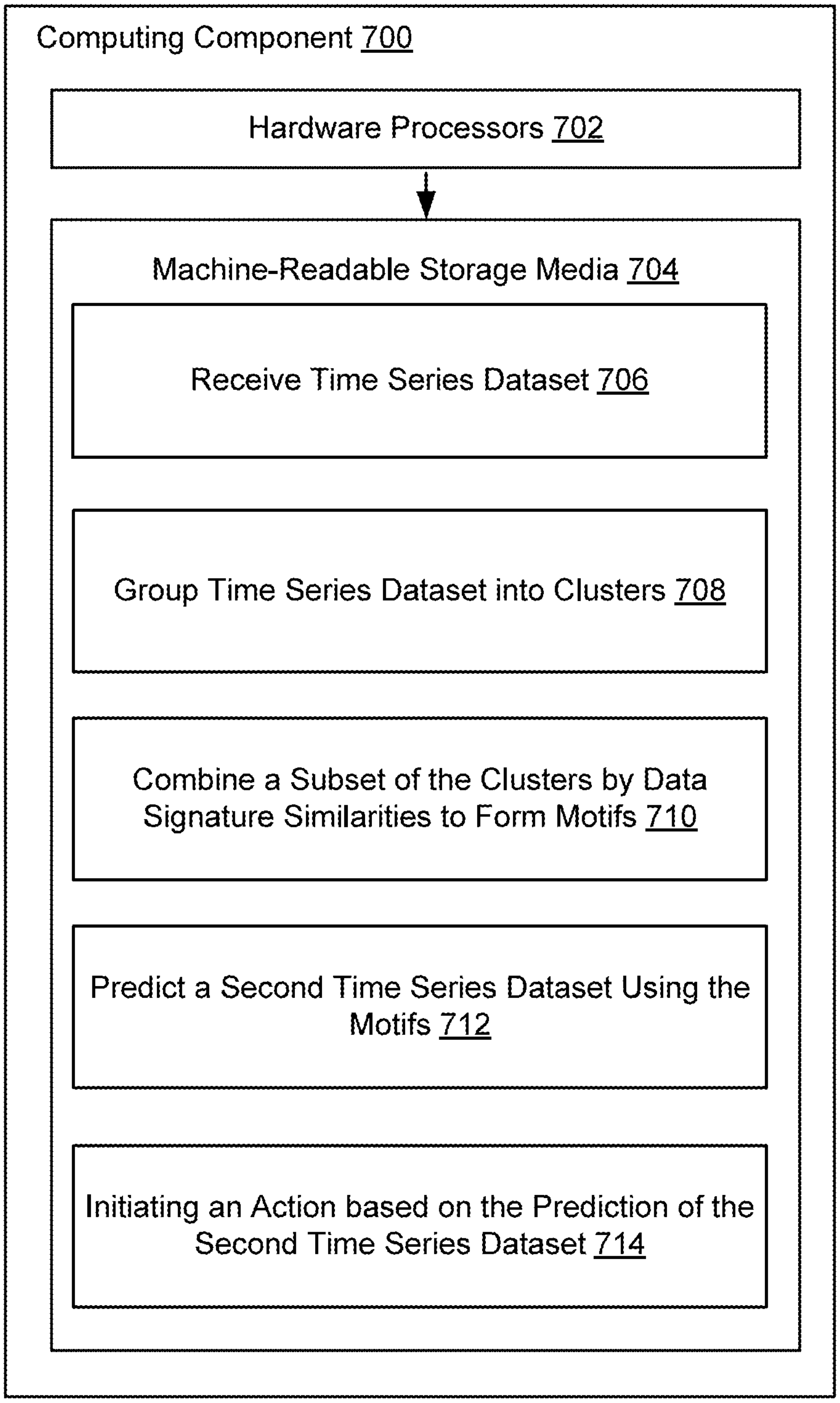
FIG. 7 is an example computing component that may be used to implement various features of embodiments described in the present disclosure.

FIG. 7 illustrates an example computing component that may be used to implement an unsupervised segmentation of univariate time series dataset using motifs and shapelets in accordance with various embodiments. Referring now to FIG. 7, computing component 700 may be, for example, a server computer, a controller, or any other similar computing component capable of processing data. In the example implementation of FIG. 7, the computing component 700 includes a hardware processor 702, and machine-readable storage medium for 704.

Hardware processor 702 may be one or more central processing units (CPUs), semiconductor-based microprocessors, and/or other hardware devices suitable for retrieval and execution of instructions stored in machine-readable storage medium 704. Hardware processor 702 may fetch, decode, and execute instructions, such as instructions 706-712, to control processes or operations for implementing the dynamically modular and customizable computing systems. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine readable storage medium, such as machine readable storage medium 704, may be any electronic, magnetic, optical, or other physical storage device that contains or stores executable instructions. Thus, machine readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine readable storage medium 704 may be a non-transitory storage medium, where the term "non-transitory" does not encompass transitory propagating signals. As described in detail below, machine readable storage medium 704 may be encoded with executable instructions, for example, instructions 706-712.

Hardware processor 702 may execute instruction 706 to receive a time series dataset. The time series dataset may be received from a sensor of a monitored processor. For example, the time series dataset may comprise various data signatures at different times. In some examples, the data received from monitored processor is limited to what a third party responsible for monitored processor is willing to provide and may be limited from a complete data history.

Hardware processor 702 may execute instruction 708 to generate the timeseries dataset into clusters. For example, the method may group the time series dataset into a plurality of clusters.

Hardware processor 702 may execute instruction 710 to combine a subset of the clusters by data signature similarities to form motifs. For example, the method may combine a subset of the plurality of clusters by data signature similarities to form a plurality of motifs. In some examples, the method may determine each centroid of the dataset in anticipation for grouping the data as a plurality of clusters.

The centroids can be initialized using various methods, including a customized K-Means cluster algorithm. The customized K-Means cluster algorithm may consider the linear fashion that the time series dataset was recorded in determining each cluster centroid. The method may initialize the centroids of each cluster with outlier points to determine local maxima and local minima points that correspond with actual values from the time series dataset. With this, the time series data may be segregated into smaller clusters areas, where each smaller cluster can include one significant minima or maxima point.

The method may also determine a distance between each of the data points and centroids, with respect to the time series constraint (e.g., along a linear time series), which can help improve standard distance functions that may wrongly cluster data points without respect to the linear inherency of time series data. The distance formula may determine an amount of change in the time axis (e.g., x-axis) as weighed less compared to the same amount of change on the performance metric axis (e.g., y-axis) so that data points can be clustered following the time axis (e.g., using the formula described herein).

Hardware processor 702 may execute instruction 712 to predict a second time series dataset. The method may predict a second time series dataset using the plurality of motifs, for example, using a dynamic time warping (DTW) process on the defined clusters to detect similarities between the clusters (e.g., in terms of the data points forming a shape within each cluster). The DTW process can calculate an optimal match between two time series datasets by measuring the similarity between the two datasets along the linear time sequence. The optimal match may also satisfy a minimal cost, where the cost is computed as the sum of absolute differences, for each matched pair of indices, between their values. Each group of similar curves can generate a motif that represents a repeated pattern and subsequence of data points that are grouped into each cluster.

Hardware processor 702 may execute instruction 714 to initiate an action. For example, the method may initiate an action based on the prediction of the second time series dataset. For example, the action may comprise determining that monitored processor corresponds with an overutilization at a particular time and transmitting an electronic communication to an account associated with the monitored processor, and a suggestion for reducing additional utilization of the monitored processor after the particular time. In another example, the action may comprise determining that the monitored processor corresponds with an overutilization at a particular time and transmitting an electronic communication to an account associated with a different monitored processor than the monitored processor. In another example, the action may comprise a prediction of the next plurality of motifs (e.g., using the trained machine learning model).

Figure 8:
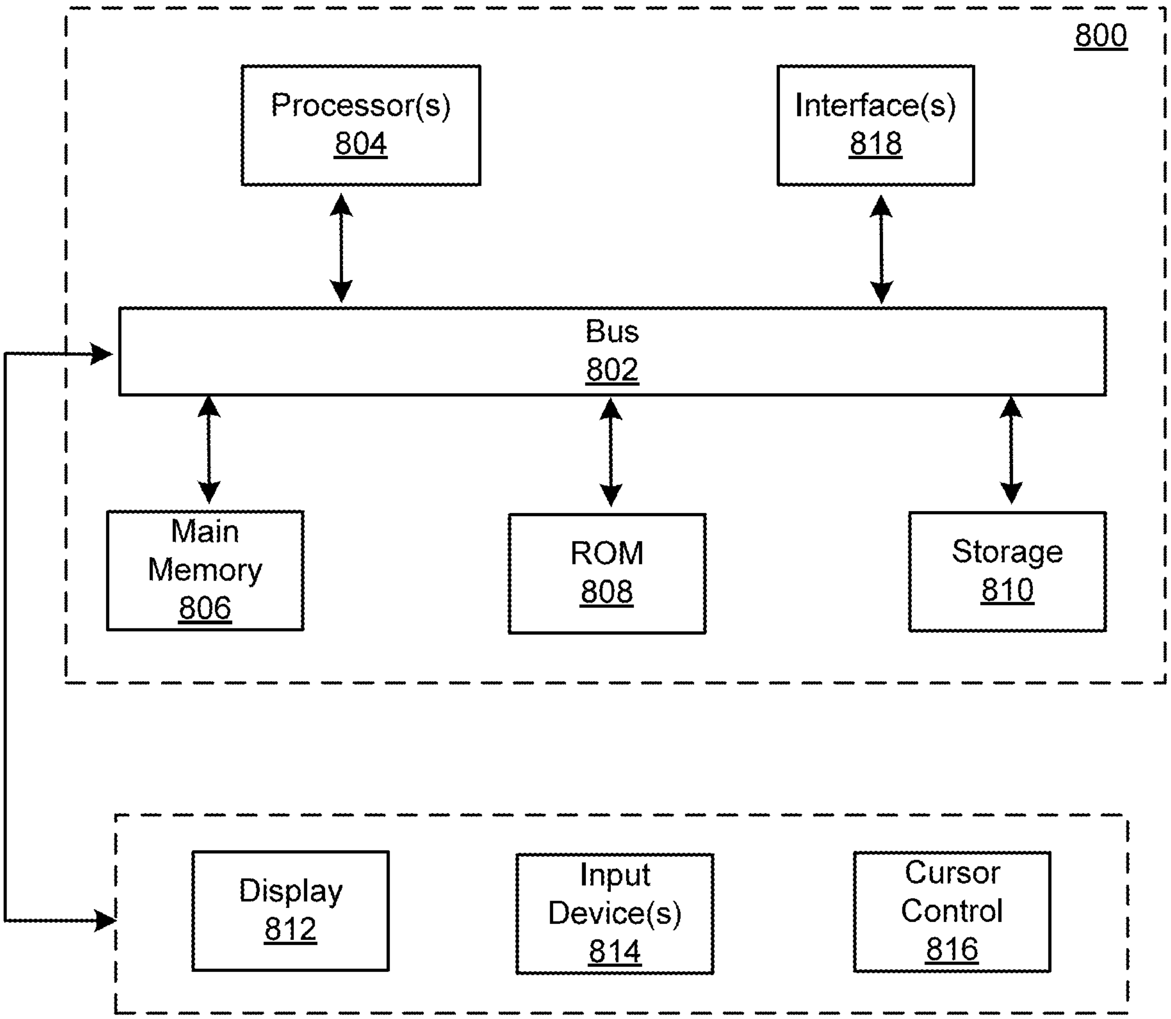
FIG. 8 depicts a block diagram of an example computer system in which various of the embodiments described herein may be implemented.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable or machine readable storage medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:

a machine readable storage medium storing instructions; and one or more processors configured to execute the instructions to cause the system to:

receive a first time series dataset from a sensor of a first monitored processor;

group the first time series dataset into a plurality of clusters;

using an unsupervised machine learning model, combine a subset of the plurality of clusters by data signature similarities to form a plurality of motifs;

combine the plurality of motifs into one or more shapelets in accordance with the data signature similarities predict, using a supervised machine learning model, a second time series dataset using the plurality of motifs or the shapelets; and initiate an action based on the prediction of the second time series dataset, wherein the action comprises:

identifying an overutilization of at least one of the first monitored processor and a second monitored processor different than the first monitored processor; and transmitting an electronic communication that indicates the overutilization of the at least one of the first monitored processor and the second monitored processor.

2. The system of claim 1, wherein each of the plurality of clusters comprises a local minima data point and a local maxima data point of the first time series dataset.

3. The system of claim 2, wherein the one or more processors are further configured to execute the instructions to cause the system to:

using the local minima data point and the local maxima data point from each of the plurality of clusters of the first time series dataset, determine a centroid of each of the plurality of clusters.

4. The system of claim 3, wherein the determination of the centroid of each of the plurality of clusters uses a customized K-Means cluster algorithm that considers a linear fashion of the first time series dataset.

5. The system of claim 1, wherein the action comprises:

transmitting the electronic communication to an account associated with the at least one of the first monitored processor and the second monitored processor, wherein the electronic communication includes a suggestion to reduce utilization of the at least one of the first monitored processor and the second monitored processor.

6. The system of claim 1, wherein the one or more processors are further configured to execute the instructions to cause the system to:

implement a feature normalization on the first time series dataset to scale individual samples of data from the first time series dataset to have common and consistent unit measurements.

7. The system of claim 1, wherein the one or more processors are further configured to execute the instructions to cause the system to:

implement a scaler process on the first time series dataset to create small standard deviations of features and preserve zero entries in sparse data.

8. A computer-implemented method comprising:

receiving a first time series dataset from a sensor of a first monitored processor;

grouping the first time series dataset into a plurality of clusters;

using an unsupervised machine learning model, combining a subset of the plurality of clusters by data signature similarities to form a plurality of motifs;

combining the plurality of motifs into one or more shapelets in accordance with the data signature similarities predicting, using a supervised machine learning model, a second time series dataset using the plurality of motifs or the shapelets; and initiating an action based on the prediction of the second time series dataset, wherein the action comprises:

identifying an overutilization of at least one of the first monitored processor and a second monitored processor different than the first monitored processor; and transmitting an electronic communication that indicates the overutilization of the at least one of the first monitored processor and the second monitored processor.

9. The method of claim 8, wherein each of the plurality of clusters comprises a local minima data point and a local maxima data point of the first time series dataset.

10. The method of claim 9, the method further comprising:

using the local minima data point and the local maxima data point from each of the plurality of clusters of the first time series dataset, determining a centroid of each of the plurality of clusters.

11. The method of claim 10, wherein the determination of the centroid of each of the plurality of clusters uses a customized K-Means cluster algorithm that considers a linear fashion of the first time series dataset.

12. The method of claim 8, wherein the action comprises:

transmitting the electronic communication to an account associated with the at least one of the first monitored processor and the second monitored processor, wherein the electronic communication includes a suggestion to reduce utilization of the at least one of the first monitored processor and the second monitored processor.

13. The method of claim 8, further comprising:

implementing a feature normalization on the first time series dataset to scale individual samples of data from the first time series dataset to have common and consistent unit measurements.

14. The method of claim 8, further comprising:

implementing a scaler process on the first time series dataset to create small standard deviations of features and preserve zero entries in sparse data.

15. A non-transitory computer-readable storage medium storing a plurality of instructions executable by one or more processors, the plurality of instructions when executed by the one or more processors cause the one or more processors to:

receive a first time series dataset from a sensor of a first monitored processor;

group the first time series dataset into a plurality of clusters;

using an unsupervised machine learning model, combine a subset of the plurality of clusters by data signature similarities to form a plurality of motifs;

combine the plurality of motifs into one or more shapelets in accordance with the data signature similarities;

predict, using a supervised machine learning model, a second time series dataset using the plurality of motifs or the shapelets; and initiate an action based on the prediction of the second time series dataset, wherein the action comprises:

identifying an overutilization of at least one of the first monitored processor and a second monitored processor different than the first monitored processor; and transmitting an electronic communication that indicates the overutilization of the at least one of the first monitored processor and the second monitored processor.

16. The non-transitory computer-readable storage medium of claim 15, wherein each of the plurality of clusters comprises a local minima data point and a local maxima data point of the first time series dataset.

17. The non-transitory computer-readable storage medium of claim 16, wherein the plurality of instructions, when executed by the one or more processors, further cause the one or more processors to:

using the local minima data point and the local maxima data point from each of the plurality of clusters of the first time series dataset, determine a centroid of each of the plurality of clusters.

18. The non-transitory computer-readable storage medium of claim 17, wherein the determination of the centroid of each of the plurality of clusters uses a customized K-Means cluster algorithm that considers a linear fashion of the first time series dataset.

19. The non-transitory computer-readable storage medium of claim 15, wherein the plurality of instructions, when executed by the one or more processors, further cause the one or more processors to:

transmit the electronic communication to an account associated with the at least one of the first monitored processor and the second monitored processor, wherein the electronic communication includes a suggestion to reduce utilization of the at least one of the first monitored processor and the second monitored processor.

20. The non-transitory computer-readable storage medium of claim 15, wherein the plurality of instructions, when executed by the one or more processors, further cause the one or more processors to:

implement a feature normalization on the first time series dataset to scale individual samples of data from the first time series dataset to have common and consistent unit measurements.

* * * * *